(12) United States Patent
Souder et al.

(10) Patent No.: US 6,532,479 B2
(45) Date of Patent: Mar. 11, 2003

(54) DATA REPLICATION FOR FRONT OFFICE AUTOMATION

(75) Inventors: Benny Souder, Belmont, CA (US); Alan Robert Downing, Fremont, CA (US); Harry Sun, Redwood City, CA (US); Alan J. Demers, Boulder Creek, CA (US); James William Stamos, Saratoga, CA (US); John C. Graham, Palo Alto, CA (US); Curtis Elsbernd, Belmont, CA (US); Mahesh Subramaniam, Foster City, CA (US); Wayne E. Smith, Palo Alto, CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/322,153

(22) Filed: May 28, 1999

(65) Prior Publication Data

US 2003/0009431 A1 Jan. 9, 2003

Related U.S. Application Data

(60) Provisional application No. 60/086,985, filed on May 28, 1998.

(51) Int. Cl.[7] .......................... G06F 12/00; G06F 17/30
(52) U.S. Cl. ..................... 707/201; 707/500.1
(58) Field of Search .................. 707/1–10, 100–104.1, 707/200–205, 500–542

(56) References Cited

U.S. PATENT DOCUMENTS

| | | | | |
|---|---|---|---|---|
| 4,631,673 A | * | 12/1986 | Haas et al. ................. 364/300 |
| 5,418,966 A | * | 5/1995 | Madduri ..................... 395/725 |
| 5,440,735 A | * | 8/1995 | Goldring .................... 395/600 |
| 5,452,448 A | * | 9/1995 | Sakuraba et al. .......... 395/600 |
| 5,553,279 A | * | 9/1996 | Goldring .................... 707/201 |
| 5,586,310 A | * | 12/1996 | Sharman .................... 395/600 |
| 5,613,113 A | * | 3/1997 | Goldring .................... 707/202 |
| 5,706,509 A | * | 1/1998 | Tso ............................ 395/617 |
| 5,737,601 A | * | 4/1998 | Jain et al. .................. 395/617 |
| 5,737,738 A | * | 4/1998 | Sharman .................... 707/201 |
| 5,806,075 A | * | 9/1998 | Jain et al. .................. 707/201 |
| 5,819,263 A | * | 10/1998 | Bromley et al. ............... 707/3 |
| 5,832,275 A | * | 11/1998 | Olds .......................... 395/712 |
| 5,848,405 A | * | 12/1998 | Norcott ......................... 707/1 |
| 5,870,759 A | * | 2/1999 | Bauer et al. ................ 707/201 |
| 5,870,765 A | * | 2/1999 | Bauer et al. ................ 707/203 |
| 5,884,325 A | * | 3/1999 | Bauer et al. ................ 707/201 |
| 5,915,091 A | * | 6/1999 | Ludwig et al. ........ 395/200.34 |
| 5,926,816 A | * | 7/1999 | Bauer et al. .................. 707/8 |
| 5,963,959 A | * | 10/1999 | Sun et al. ................... 707/200 |
| 5,995,980 A | | 11/1999 | Olson et al. |
| 5,999,936 A | | 12/1999 | Pattison et al. |
| 6,006,232 A | | 12/1999 | Lyons |
| 6,006,331 A | * | 12/1999 | Chu et al. ................... 713/201 |
| 6,009,440 A | * | 12/1999 | Watson et al. .............. 707/203 |
| 6,151,602 A | | 11/2000 | Hejlsberg et al. |
| 6,272,502 B1 | * | 8/2001 | Lieuwen et al. ............ 707/203 |
| 6,289,335 B1 | * | 9/2001 | Downing et al. .............. 707/3 |
| 6,314,439 B1 | * | 11/2001 | Bates et al. ................. 707/513 |
| 6,366,933 B1 | * | 4/2002 | Ball et al. ................... 707/511 |

\* cited by examiner

*Primary Examiner*—Greta Robinson
*Assistant Examiner*—Linh Black
(74) *Attorney, Agent, or Firm*—Ditthavong & Carlson, P.C.

(57) ABSTRACT

Replication for front office automation involves the use of snapshots that are instantiated on laptops, in which refreshing the snapshots is driven from a master site with a high-performance protocol. All of the necessary snapshot metadata for performing the snapshot refreshes is stored at the master site, so that the laptop only needs to send a single refresh request. In response to the refresh request, the master site reconciles the differences between the master tables and the laptop's snapshots and transmits the differences to the laptop, reducing the necessary network traffic for updating a snapshot to a single round trip.

19 Claims, 13 Drawing Sheets

(Background)

(Background)

DATA REPLICATION FOR FRONT OFFICE AUTOMATION

RELATED APPLICATIONS

The present application claims the benefit of U.S. Provisional Application No. 60/086,985 entitled "Replication for Front Office Replication" filed on May 28, 1998 by Benny Souder, Alan Downing, Harry Sun, Alan Demers, James Stamos, John Graham, and Curtis Elsbernd, the contents of which are hereby incorporated by reference herein.

The present application is related to the following commonly-assigned U.S. patent applications, the contents of all of which in their entirety are hereby incorporated by reference herein:

- U.S. application Ser. No. 09/322,152 entitled "Data Replication for Front Office Automation" filed on May 28, 1999 by Benny Souder, Alan Downing, Harry Sun, Alan Demers, James Stamos, John C. Graham, Curtis Elsbernd, Mahesh Subramaniam, and Wayne E. Smith;
- U.S. application Ser. No. 09/321,622 entitled "Light-weight Data Replication" filed on May 28, 1999 by Sukanya Balaraman, Alan Downing, John C. Graham, Lewis S. Kaplan, Benny Souder, and Harry Sun;
- U.S. application Ser. No. 09/321,624 entitled "Data Replication Security" filed on same date herewith by Wayne E. Smith and Alan Downing;
- U.S. application Ser. No. 09/321,625 entitled "Mass Deployment of Front Office Applications" filed on May 28, 1999 by Curtis Elsbernd, Benny Souder, and Wayne E. Smith; and
- U.S. application Ser. No. 09/321,594 entitled "Schema Evolution in Replication" filed on May 28, 1999 by Alan Demers, Curtis Elsbernd, James Stamos, and Lik Wong.

FIELD OF THE INVENTION

The present invention relates to distributed database systems and more particularly to replication of data at distributed sites.

BACKGROUND OF THE INVENTION

Modern data processing systems have evolved from a single, centralized mainframe to a network of independent processing systems. The efficiency of such distributed systems depends not only on the processing power of each computer site but on the ability of the system to efficiently access the information required by a user. Generally, a site can access data that resides on local storage much faster than it can access data at another site over a network connection. To take advantage of the efficiency of local access operations, some systems allow the same set of data to be maintained on multiple nodes. The mechanism for maintaining multiple copies of the same body of data at multiple sites is generally referred to as "data replication." In a distributed database system using data replication, multiple replicas of data exist in more than one database in the distributed database system.

One kind of data replication employs snapshots. A snapshot is a body of data constructed of data from one or more "master" tables, views, or even other snapshots, any of which can be stored locally or remotely relative to the snapshot. The data contained within the snapshot is defined by a query that references one or more master tables (and/or other database objects) and reflects the state of its master tables at a particular point in time. To bring the snapshot up-to-date with respect to the master tables, the snapshot is refreshed upon request, e.g. at a user's command or automatically on a periodic, scheduled basis.

There are two basic approaches for refreshing a snapshot. "Complete refreshing" involves reissuing the defining query for the snapshot and replacing the previous snapshot with the results of the reissued query. "Incremental refresh" or "fast refresh" refers to identifying the changes that have happened to the master tables since the previous refresh (typically, by examining a log file of the changes) and transferring only the data for the rows in the snapshot that have been affected by the master table changes. An "updatable snapshot" is a snapshot to which updates may be directly made at the snapshot site. These updates are propagated from the snapshot back to the master table before refreshing.

High-End Snapshot Replication

Traditionally, snapshots have been implemented for high-end computer systems, which are characterized by the use of high performance computers that are interconnected to one another by highly reliable and high bandwidth network links. Typically, highly experienced database administrators manage these high-end systems. Due to the expense of these high-end computers, high-end distributed systems tend to involve a small number of networked sites, whose users can be trusted at least in part because of the physical security of the computers.

FIG. 12 depicts an exemplary high-end distributed database system for a company's sales department consisting of three sites, master site 1200, client site 1220, and client site 1240. Master site 1200, which may be located, for example, at the company's headquarters, includes a full relational database server 1202 that is responsible for storing and retrieving data from a relational database 1204. In this example, relational database 1204 contains a customers master table 1212 and an orders master table 1214. The customers master table 1212 is illustrative of the data stored in rows for each customer of the company and includes columns for the customer number CUSTNO and the sales representative REP to whom the customer is assigned. For example, customer 13 is assigned to sales representative Smith, and customer 18 is assigned to sales representative Jones. As illustrated, orders master table 1214 holds the data stored in rows for each order that a customer has placed and includes a column ORDER that indicates the number of the order and a CUSTNO column that is correlated to a customer in the customer masters table 1212. For example, order 25 was placed by customer 13, and orders 40 and 41 were placed by customer 18.

In this high-end distributed database system, the client site 1220 is located at one sales office and client site 1240 is located at another sales office, for example in another city. Accordingly, it is desirable to have a copy of the customer and order information at the local site for the sales representatives who are located at the corresponding sales office. For example, if sales representative Smith is located at the sales office for client site 1220 or if sales representative Jones is located at the sales office for client site 1240, then it would be desirable to store the customer and order information for Smith (and other sales representatives at the same sales office) at client site 1220 and the information for Jones (and coworkers) at client site 1240.

Therefore, client site 1220, which also has a full relational database server 1222, stores snapshots of the customer master table 1212 and the order master table 1214 in local relational database 1224 as customer snapshot 1232 and order snapshot 1234, respectively. Since only some of the sales representatives are located at the sales office for the client site 1220, the customer snapshot 1232 and order snapshot 1234 only hold a subset of the data in the customer master table 1212 and the order master table 1214, respectively. In this example, the customer snapshot 1232 is shown to contain the rows for Smith's customers and the order snapshot 1234 for the corresponding order information. All the information required to maintain and drive the refreshes for the local snapshots 1232, 1234, such as the defining queries for the snapshots 1232, 1234 and the latest refresh times, is kept in snapshot metadata 1226.

Similarly, client site 1240 also has a full relational database server 1242 and stores snapshots of the customer master table 1212 and the order master table 1214 in local relational database 1244 as customer snapshot 1252 and order snapshot 1254, respectively. Since different sales representatives are located at the sales office for the client site 1240, the customer snapshot 1252 and order snapshot 1254 maintain a different subset of the data in customer master table 1212 and order master table 1214, respectively. Shown in this example, customer snapshot 1252 contains the rows for Jones's customers and order snapshot 1254 contains the corresponding order information. All the information required to maintain and drive the refreshes for the local snapshots 1252, 1254, such as the defining queries for the snapshots 1252, 1254 and the latest refresh times, is kept in snapshot metadata 1256.

For a more detailed description of how a snapshot is refreshed in one high-end snapshot replication environment, the reader is referred to the commonly assigned U.S. patent application Ser. No. 08/865,645, entitled "Fast Refresh of Snapshots" filed on May 30, 1997 by Harry Sun, Alan Downing, and Benny Souder, now U.S. Pat. No. 5,963,959 issued Oct. 4, 1999, the contents of which are incorporated by reference in their entirety herein. FIG. 13, however, is provided to briefly illustrate some of the operations involved in refreshing a snapshot in an exemplary high-end environment.

In response to one or more refresh requests, the client database server 1222 iterates through a series of doubly nested loops, first for each snapshot for which the requests were made and then for each base or master table used by the snapshot. In the doubly nested loop controlled by step 1300, the client database server 1222 sends a "Set Up" remote procedure call (RPC) to the master site 1200 (step 1302). When the master site 1200 receives the Set Up RPC call, the master database server 1202 performs the remotely called set up operation (step 1304). The set up operation, which is used because there can be multiple snapshots defined for the same table, processes the master log files corresponding to the master tables to set the refresh time of the most recently added changes to the master tables in the master logs to the current refresh time.

In the doubly nested loop controlled by step 1320, the client database server 1222 formulates Structured Query Language (SQL) select statements based on the local snapshot metadata 1226 and sends the SQL select statements as RPC calls to the master site 1200 (step 1322). In response, the master database server 1202 performs the SQL select statement, to select the rows in a particular master table that have changed based on entries in the master log and transmits the selected rows back to the client site 1220 (step 1324). The client database server 1222 uses the retrieved rows to update the snapshot (step 1326). In practice, however, steps 1322, 1324, and 1326 are performed two separate times, the first time to identify and delete the old rows from the snapshots 1232, 1234 and the second time to identify and get the new rows to update and/or insert in the snapshots 1232, 1234.

Finally, in the doubly nested loop controlled by step 1340, the client database server 1222 sends a "Wrap Up" remote procedure call (RPC) to the master site 1200 (step 1342). When the master site 1200 receives the Wrap Up RPC call, the master database server 1202 performs the wrap up operation (step 1344). The wrap up operation, also used because there can be multiple snapshots defined for the same table, purges the master logs of the entries that are older than the least recently refreshed snapshot to prevent the master logs from growing unacceptably large.

Front Office Automation

Recently, there has been much interest in the marketplace for applications for front office automation. One example is sales force automation, where hundreds, if not thousands, of sales representatives in a company are given laptops or other portable computing such as palmtops to improve their productivity. The laptops are loaded with applications, for example, to help a sales representative sell the company's products to a customer and take the customer's order. Therefore, the laptops include a data store to keep the customer and order information handy for use by a specific sales representative.

Front office automation, however, challenges the operating assumptions behind the high-end snapshot implementations. For example, laptops are not high-performance computer systems and are only sporadically connected to a master site, typically for short periods of time. Moreover, laptops can get or stolen, raising security concerns. In addition, it is difficult to deploy a large number of front office applications with many different snapshots, particularly when the applications themselves are evolving. Therefore, implementing a high-end snapshot replication approach for front-office automation incurs a number of disadvantages that, if not addressed, render the use of snapshots problematic for front office automation.

For example, refreshing snapshots in the high-end approach is driven from the client site 1220, which is intended to help in load balancing among high-performance computers. As a result, there are many round-trips RPCs between the client site 1220 and the master site 1200. Since there is a market demand for front office applications to use, for example, 200 snapshots each with two master tables, a high-end implementation of snapshot replication would require, in this example, 400 RPCs for the Set Up operations, 400 RPCs for the SQL select statement to identify the deleted rows, 400 RPCs for the SQL select statement to identify the new or updated rows, and another 400 RPCs for the Wrap Up operations. Moreover, since each RPC for the SQL select is about one-half of a kilobyte, the two sets of RPCs for the SQL select statements together require a total of about 400 kilobytes of traffic. This overhead is always incurred despite the number of rows, if any, that have actually changed in the snapshots. Although high bandwidth T1 lines can handle this traffic at acceptable levels for many high-end implementations, the typical connection from a laptop is over a dial up line, which would take a long time and be very expensive if made over a cell phone.

In addition, high-end snapshot replication uses a full relational database system at each site to drive the snapshot refreshes, receive the row data in a SQL format, and apply the changes. Since laptops are computationally constrained, it is desirable to implement thin clients responsible for presenting a graphical user interface (GUI), for example JAVA™ applications, rather than requiring a full relational database system. However, the high-end row transfer mechanism employs a thick, SQL application programming interface (API).

Replication in a front office automation environment must contend with the very real possibility that laptops get lost or stolen, for example, in airports. Although logins and passwords protect the connections between the laptop and the master site, this authentication mechanism cannot be fully trusted as secure because sales representatives often record their passwords near their laptops, for example, taped near the screen. The above-described high-end snapshot replication approach, however, relies on trusted snapshot users, granting them extensive privileges to select any table and execute any procedure in support of the snapshot refreshes being driven from the client site. If such a high-end approach is implemented for laptops, a malicious person could easily steal a sales representative's laptop, connect to the master site using the password taped to the side of the laptop, and hack into the system, reading and destroying sensitive data.

Mass deployment of front office applications and the data to support them is another difficult issue when there are hundreds, if not thousands, of laptops functioning as client sites. Since the snapshot metadata is stored at the client site in the high-end approach, the snapshots for the front office applications have to be individually instantiated by a person at the laptop, when the laptop is connected to the master site. The typical sales representative, however, does not have the training to perform this operation. Moreover, instantiating these snapshots is especially time-consuming when done over a low bandwidth connection.

Front office applications evolve over time. As the applications change from version to version, typically new columns are added to the master tables or some columns are removed, rendering the instantiated snapshots at the laptops incompatible with the master site. Consequently, sales representatives must stop updating to their own copies of the data and bring their laptops into the master site for upgrading by an experience database administrator. This procedure is an administrative nightmare because it requires every laptop to be upgraded first.

SUMMARY OF THE INVENTION

There is a need for an implementation of snapshot replication that is suitable in a front office automation environment without incurring the above-described and other disadvantages incumbent in a high-end implement of snapshot replication.

This and other needs are addressed by the present invention in which snapshot refreshing is driven from the master site. For example, the master site stores all of the necessary snapshot metadata for performing the snapshot refreshes, so that the client site only needs to send a single refresh request. In response to the refresh request, the master site reconciles the differences between the master tables and the client's snapshots and transmits the differences to the client site, reducing the necessary network traffic for updating a snapshot to a single round trip.

In another aspect of the invention, refresh groups are defined to group together many related snapshots that logically should be refreshed at the same time, for example, the snapshots used by a front office application suite. Thus, only a single refresh request need be sent from the client site to the master site to cause all the snapshots at the client site to be refreshed. In the above example of 200 snapshots with 2 master tables each, the 1600 round trip RPCs are replaced by a single round-trip RPC, because the master site is now responsible for refreshing every snapshot in the 200 snapshot refresh group.

With the snapshot refresh being driven at the master site, there is no longer a need for a full relational database system to be implemented at the client site. Therefore, another aspect of the invention relates to a lightweight row transfer protocol that can be easily handled, for example, by both high-end applications and thin clients, such as JAVA™ applications using the Common Object Request Broker Architecture (CORBA). This lightweight row transfer protocol serves to reduce bandwidth requirements by applying compression techniques to reduce the number and sizeof column lengths in a "result set" of rows that are transmitted from one computer to another.

In another aspect of the invention relating to improved security, untrusted users are granted only connect privileges and the ability to run a refresh program. The refresh program runs in the security domain of a trusted user, which first checks to see if the requesting user actually owns the snapshot. Thus, security is enhanced because knowing the password for a sales representative only gives an unauthorized user the ability to refresh the snapshot and little if nothing else.

Yet another aspect of the invention is directed to fostering mass deployment of snapshots in a refresh group by allowing a template to be defined. A template allows for a parameterized snapshot definition query or other DDL statement to be defined, so that user-specific or site-specific value can be substituted into a parameter to create different objects. Furthermore, off-line instantiation of snapshots is provided, so that the data for an entire suite of front office applications can be stored on a floppy disk, magnetic disk, CD-ROM, or other transportable computer-readable medium. This computer-readable medium is capable of being applied to a laptop, for example by insertion into a CD-ROM drive, so that an installation program can install the requisite snapshots without the intervention required of an experienced database administrator.

Still another aspect of the invention relates to upward migration of a client application and data to a new version of the application at the master site. Specifically, the related collections of master tables and other database objects at the master site can be defined as belonging to an object group. This object group can be given different "flavors" that define different subsets of the objects and even different subsets of the columns in the master tables. When a laptop uploads the changes to an updatable snapshot, the current flavor of the laptop for the object group is also transmitted, so that the master site can make the necessary adjustments in the uploaded changes by dropping the values for obsolete columns and using default values for new columns.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENTS

A method, article, and apparatus for front office replication is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Hardware Overview

Figure 1:
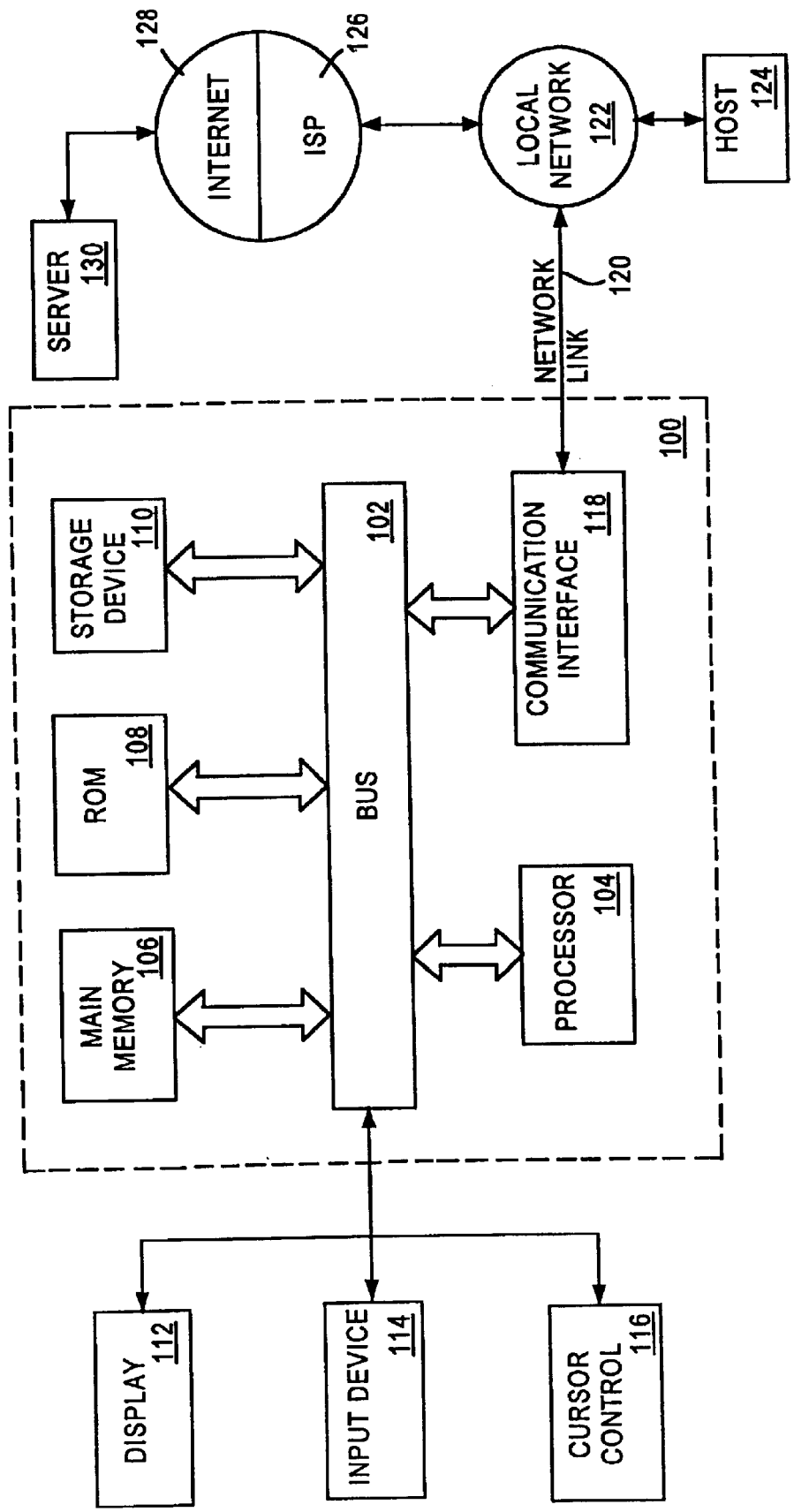
FIG. 1 depicts a computer system on which an embodiment of the present invention can be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for front office replication. According to one embodiment of the invention, front office replication is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that bus 102 employs. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a moden. A modern local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modern to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for front office replication as described herein. The received code may be executed by processor 104 as it is received, and/or stored in storage device 110, or other non-volatile storage for later execution. In this manner, computer system 100 may obtain application code downloaded on a carrier wave.

Architectural Overview

Figure 2:
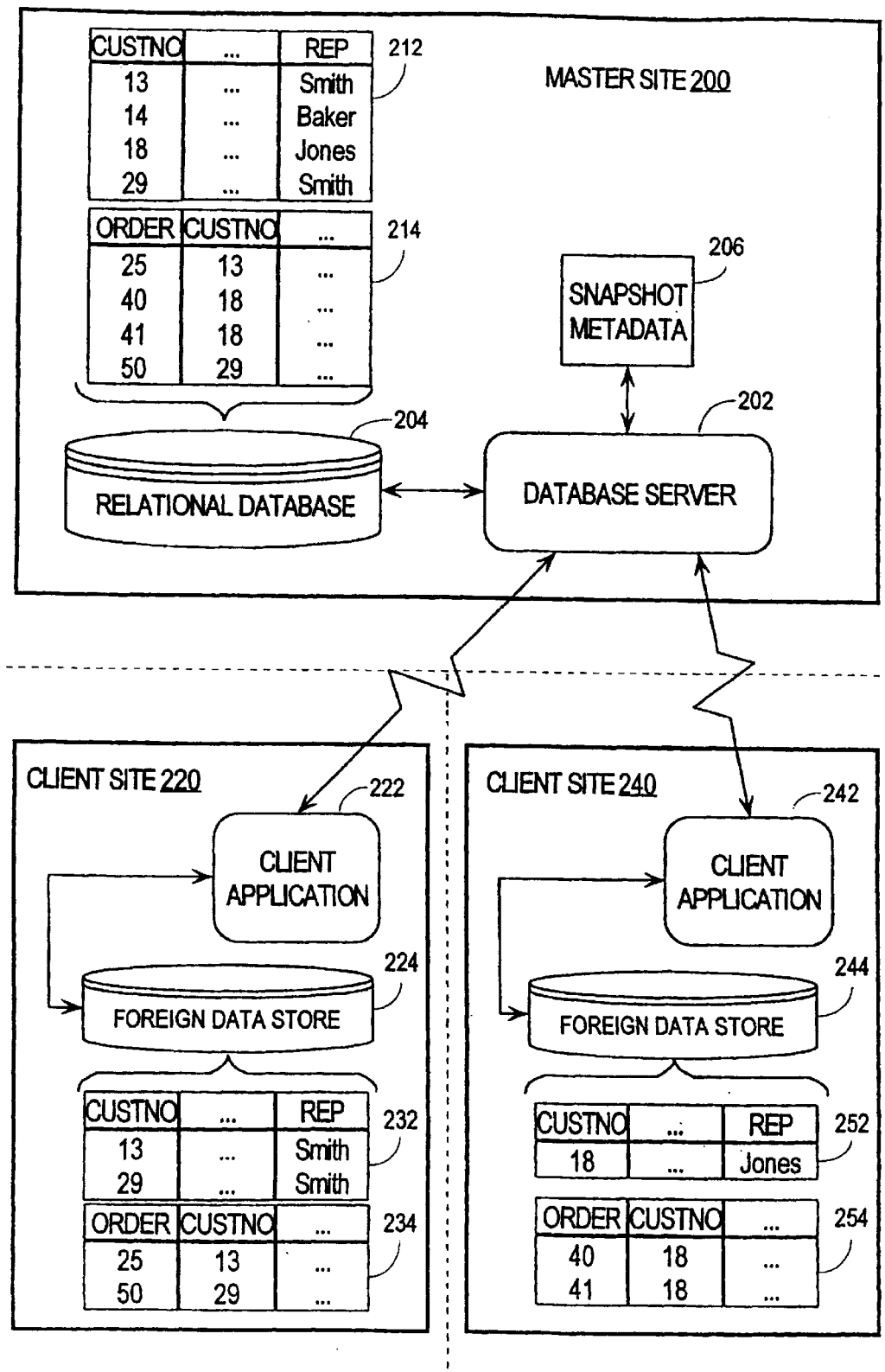
FIG. 2 is a schematic depiction of a snapshot replication environment in accordance with an embodiment.

FIG. 2 depicts an exemplary snapshot replication environment in accordance with one embodiment of the present invention for a company's sales department comprising a master site 200, client site 220, and client site 240. Master site 200, which may be a high-performance computer system at the company's headquarters, includes a relational database server 202 that is responsible for storing and retrieving data from a relational database 204. In this example, relational database 204 contains a customers master table 212 and an orders master table 214. The customers master table 212 is illustrative of the data stored in rows for each customer of the company and includes columns for the customer number CUSTNO and the sales representative REP to whom the customer is assigned. For example, customers 13 and 29 is assigned to sales representative Smith, and customer 18 is assigned to sales representative Jones. The orders master 214 illustrates the data stored in rows for each order that a customer makes and includes a column ORDER that indicates the number of the order and a CUSTNO column that is correlated to the customer in the customer masters table 212. For example, order 25 was placed by customer 13, and orders 40 and 41 were placed by customer 18.

In the illustrated embodiment, client site 220 and client site 240 are laptops that are temporarily connected to the master site 200 by a dial up line or the like, and belong to sales representatives Smith and Jones, respectively. In a front office automation environment, it is desirable for Smith to have a copy of Smith's customer information and a copy of the corresponding order information for those customers at Smith's laptop, i.e. client site 220, and for Jones to have a copy of Jones's customer and order information at Jones's laptop, i.e. client site 240.

Accordingly, client site 220 includes a front office client application 222, for example a thin application implemented in JAVA™, that manages a foreign data store 224 that contains snapshots of the customer master table 212 and the order master table 214 as customer snapshot 232 and order snapshot 234, respectively. Foreign data store 224 need not be a relational database and may be implemented by less sophisticated means. Since Smith is presumably only interested in Smith's own data, the customer snapshot 232 and order snapshot 234 only keep a subset of the data in the customer master table 212 and the order master table 214, respectively. Specifically, customer snapshot 232 contains the rows for Smith's customers and order snapshot 234 contains the corresponding order information. For example, customer snapshot 232 contains two rows for customers 13 and 29, and rows for orders 25 and 50 are kept in order snapshot 234. The information required to maintain and drive the refreshes for the local snapshots 232, 234, such as the defining queries for the snapshots 232, 234 and the latest refresh times, however, is kept at the master site 200 in snapshot metadata 206, although client site 220 maintains some metadata (not shown) identifying which snapshots are instantiated there, the refresh groups to which they belong, and the columns and column groups of each snapshot. Refresh groups and column groups are described in greater detail hereinafter.

Similarly, client site 240 includes a front office client application 242, such as a thin application implemented in JAVA™, that manages a foreign data store 244 that containing snapshots of the customer master table 212 and the order master table 214 as customer snapshot 252 and order snapshot 234, respectively. Foreign data store 244 need not be a relational database and may be implemented by less sophisticated means. Since Jones is only properly interested in Jones's own data, the customer snapshot 252 and order snapshot 254 only keep a subset of the data in the customer master table 212 and the order master table 214, respectively. Specifically, the customer snapshot 252 contains a row for Jones's customers (e.g. customer 18) and the order snapshot 254 contains the corresponding order information (e.g. orders 40 and 41). The information required to maintain and drive the refreshes for the local snapshots, such as the defining queries for the snapshots and the latest refresh times, however, is kept at the master site 200 in snapshot metadata 206, although client site 240 maintains some metadata identifying which snapshots are instantiated there, the refresh groups to which they belong, and the columns and column groups of each snapshot.

Snapshot Metadata Located at Master Site

Figure 3:
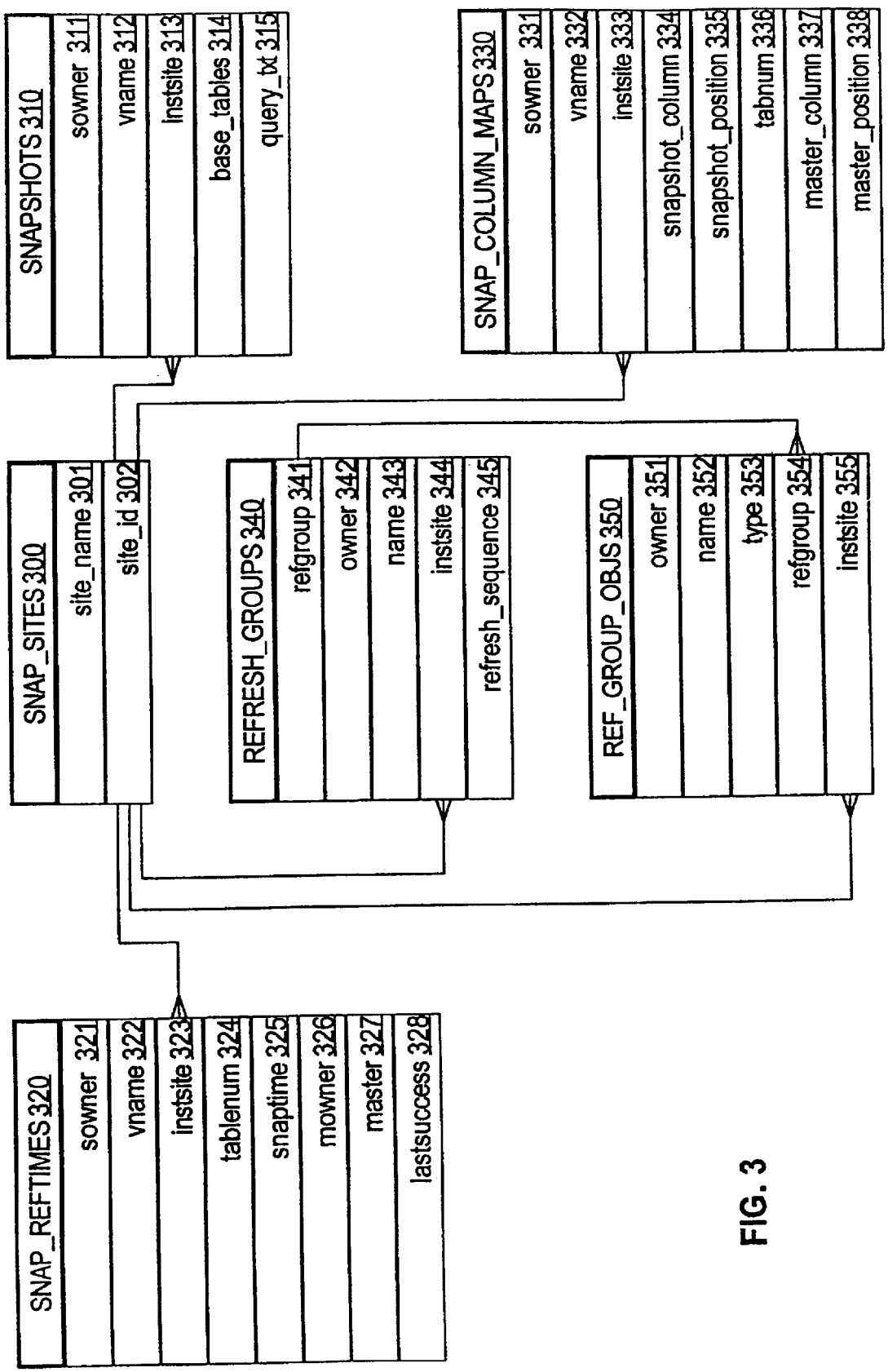
FIG. 3 illustrates snapshot metadata stored at a master site according to an embodiment.

According to one aspect of the invention, snapshot metadata 206 is stored at the master site 200 for supporting driving refreshes at the master site 200 of snapshots instantiated at client sites 220, 240. Some of the snapshot metadata 206 in accordance with one embodiment, is illustrated in FIG. 3 as a collection of data dictionary tables. The names for the data dictionary tables and their fields are supplied for ease of comprehension and need not reflect the actual name of any data dictionary table and their fields created at a master site 200 in any particular implementation.

Data dictionary table SNAP_SITES 300 is provided to maintain information about the various client sites at which the snapshots are instantiated. The site_name 301 of the data dictionary table SNAP_SITES 300 contains a user-friendly string for the name of the client site and must be unique within the replication environment. The site_id 302 contains a computer-friendly numeric identifier, which can be sequentially assigned and uniquely corresponds to each site_name 301. Each snapshot in this environment is identified by a key comprising the owner of the snapshot, the name of the snapshot, and the site identifier of the snapshot.

Data dictionary table SNAPSHOT 310 holds the main metadata for all the snapshots managed by the master site 200. Sowner 311 contains the name of the owner of the snapshot, vname 312 contains the name of the snapshot, and instsite 313 contains the site identifier (correlated to site_id 302) of the snapshot, thereby uniquely identifying the snapshot. An instsite 313 value of 0 identifies a server-side snapshot, as in the high-end implementation of snapshot replication. Two other pieces of metadata are illustrated in data dictionary table SNAPSHOTS 310, base_tables 314, which indicates the master tables, views, or other database objects that are used for the snapshot, and query_txt 315 containing the definition query for the snapshot.

Data dictionary table SNAP_REFTIMES 320 maintains the refresh timestamps for each master table of a snapshot. Sowner 321 contains the name of the owner of the snapshot, vname 322 contains the name of the snapshot, and instsite 323 contains the site identifier (correlated to site_id 302) of the snapshot, thereby uniquely identifying the snapshot. An instsite 323 value of 0 identifies a server-side snapshot, as in the high-end implementation of snapshot replication. Snaptime 325 identifies the last time the master table was involved in a refresh. The tablenum 324 is a numeric identifier for the master table, mowner 326 identifies the owner of the master table, and master 327 contains the name of the master table. Lastsuccess 328 indicates the last, verified successful refresh time for a snapshot.

Data dictionary table SNAP_COLUMN_MAPS 330 stores information about the aliasing of the snapshot columns with the master table columns. Sowner 331 contains the name of the owner of the snapshot, vname 332 contains the name of the snapshot, and instsite 333 contains the site identifier (correlated to site_id 302) of the snapshot, thereby uniquely identifying the snapshot. An instsite 333 value of 0 identifies a server-side snapshot, as in the high-end implementation of snapshot replication. Snapshot_column 334 contains the name of the snapshot column and snapshot_position 335 identifies the position of the column in the snapshot. Likewise, for the corresponding columns of the master table (identified by tabnum 336), master_column 337 contains the name of the master column and snapshot_position 338 identifies the position of the column in the master table.

Since the snapshot metadata 206 for refreshing snapshots is stored at the master site 200, the master database server 200 has all the information for driving the refresh at its own site, without needing to confer with a client site to reconcile the difference between the master tables 212, 214 and the snapshots 232, 234, avoiding almost all of the round trip RPCs for refreshing snapshots in the high-end implementation. Consequently, the bandwidth requirements of the network connection are significantly reduced, enabling the use of dial up lines and the like at acceptable levels of performance.

Refresh Groups

Another aspect of the invention, refresh groups, stems from the realization that a laptop user normally expects to refresh all the snapshots used by a suite of front office automation software at the same time. A refresh group is a collection of related snapshots that are refreshed at the same time. For example, the various snapshots of a front office application suite can be placed in the same refresh group, to allow them all to be refreshed at the same time.

Accordingly, snapshot metadata 206 also stores metadata to maintain refresh groups. With continued reference to FIG. 3, data dictionary table REFRESH_GROUPS 340 holds the metadata for the each refresh group defined at the master site 200. Refgroup 341 contains a number identifying the refresh group, owner 342 identifies the owner of the refresh group, and name 343 is a string storing user-friendly name of the refresh group. Instsite 344 contains an identifier (correlated to site_id 302) of the site at which the refresh group is instantiated.

Data dictionary table REF_GROUP_OBJECTS 350 tracks the objects defined for a refresh group. Each object in the refresh group, for example a snapshot, is identified by a key comprising owner 351 for the name of the owner of the snapshot, name 352 for the name of the object, and instsite 355 for the site identifier (correlated to site_id 302) of the snapshot, thereby uniquely identifying the snapshot. An instsite 355 value of 0, of course, identifies a server-side refresh group object, an improvement compatible with the high-end implementation of snapshot replication. Type 353 indicates the type of the refresh group object and defaults to "snapshot." Refgroup 354 is correlated with refgroup 341 to identify the refresh group for with the object defined.

Since refresh groups collect related snapshots at a client site, provision of refresh groups, therefore, allows the multiplicity of separate RPC calls for each snapshot and master table to be combined into a single snapshot refresh request, thereby further reducing the bandwidth requirements for the connection between the master site 200 and the client site 220. For example, if 200 snapshots of a front office application suite are placed in the same refresh group, then the client site 220 needs only make a single refresh request to the master site 200 to refresh all 200 snapshots.

Mass Deployment

Another aspect of the invention stems from the realization that most snapshot definition queries between different users in a front office environment are very similar to one another structurally except for values of certain literals or constants such as the name, territory, or other identification of the sales representative. For example, the snapshot definition queries for Smith's customer snapshot 232 and Smith's order snapshot 234 are similar to the snapshot definition queries for Jones's customer snapshot 252 and Jones's order snapshot 254, except that Smith's snapshot definition queries use "Smith" as the REP value and Jones's snapshot definition queries use "Jones" as the REP value. In this example, common for front office automation, each client site 220, 240 will use snapshots defined by structurally related snapshot definition queries.

Figure 4:
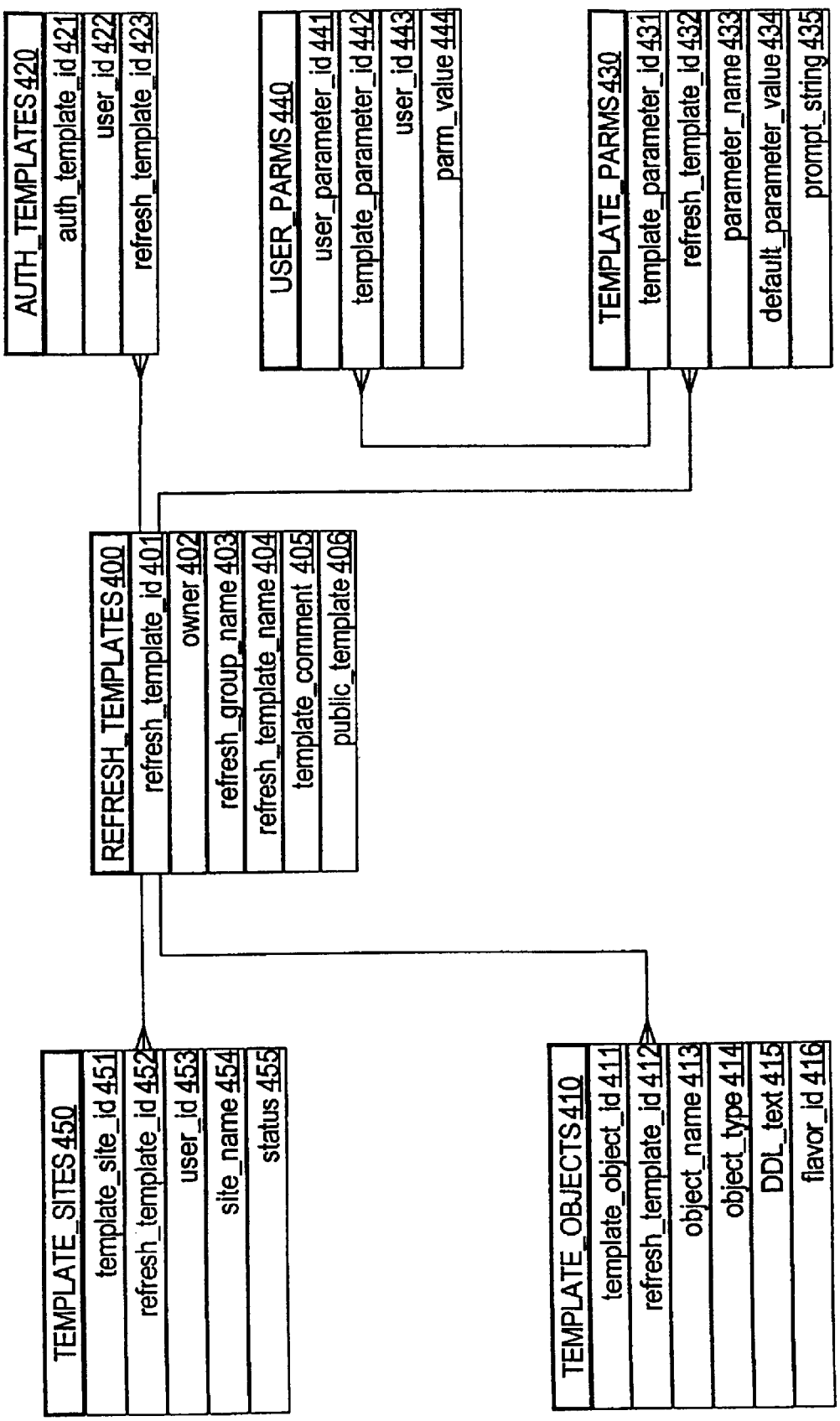
FIG. 4 illustrates metadata for refresh group templates for mass deployment of snapshots for an embodiment.

Accordingly, refresh group templates are provided to enable structurally related snapshot definition queries to be defined parametrically. That is, the basic snapshot definition query is defined once for multiple sites 220, 240 at the master site 200 and the appropriate literals are filled in for each site 220, 240. FIG. 4 illustrates the metadata (also stored among snapshot metadata 206) that supports refresh group templates according to one embodiment.

Data dictionary table REFRESH_TEMPLATES 400 is the top level data dictionary table for refresh group templates. Each refresh group template is identified by a number, refresh_template_id 401. Owner 402 names the owner of the refresh group template, and the refresh_group_name 403 and the refresh_template_name 404 contain a user-friendly name for the instantiated refresh group and the instantiating refresh group template, respectively. A template_comment 405 is also provided for documentation purposes. Public_template 406 indicates whether anyone can instantiate the current refresh group template (if public) or whether only specific authorized users are allowed to the instantiate the current refresh group template (if private).

Data dictionary table TEMPLATE_OBJECTS 410 specifies the database objects in a refresh group template. Template_object_id 411 is a key to identify the various database objects specified in the refresh group templates, and refresh_template_id 412 correlates the template object to a specific refresh group template. The user-friendly string name of the template object is given by object_name 413, and the type of the object by object_type 414, for example, "snapshot." The DDL_text 415 contains a parameterized Data Description Language (DDL) string that defines how to create the template object and may contain parameters for use with parameter substitution. In one embodiment, when entries are added to this data dictionary table, the DDL_text 415 is examined for parameters and corresponding entries are automatically inserted into the data dictionary table TEMPLATE_PARMS 430, which is described hereinafter.

In the example illustrated in FIG. 2, a DDL string that defines the customer snapshots 232, 252 would be "create snapshot customers as select * from customers@master where rep=:rep_id;" and a DDL string that defines the order snapshots 234, 254 would be "create snapshot orders as select * from orders@master o where exists (select custno from customers@master c where c.custno=o.custno and rep=:rep_id);" wherein ":rep_id" given by a colon prefix is the parameter to be substituted for a specific sales representative.

The flavor of the object group that the refresh group template belongs to is given by flavor_id 416. An object group is a collection of related master tables and other database objects, generally to maintain consistency for inaster-to-master replications. Object groups within the context of master-to-master replication are described in more detail in the commonly assigned U.S. Pat. No. 5,799,306 entitled "Method and apparatus for facilitating data replication using object groups" issued Aug. 25, 1998 to Harry Sun et al., whose entire contents is hereby incorporated by reference herein. A flavor of an object group specifies a subset of the objects in the object group and a subset of the columns of each table or index in the object group, including all primary key columns. Thus, two sites instantiated with different flavors of an object group may hold different subsets of the objects in the object group, and the tables they hold in common may have different sets of columns.

Data dictionary table AUTH_TEMPLATES 420 is used to track authorizations of private refresh group templates. Each authorization is identified by the auth_template id 421 key and contains a user_id 422 and a refresh_template_id 423. Thus, when a user attempts to instantiate a private refresh group template, the user's id is compared with the user_id 422 for the entries having a refresh_template_id 423 that identifies the private refresh group template.

Data dictionary table TEMPLATE_PARMS 430 contains the parameters used in a refresh group template. Each template parameter, which is identified by a unique template_parameter_id 431 key, specifies the refresh_template_id 432 to identify the refresh group template, the parameter_name 433 for the name of the template parameter, a default_parameter_value 434 to hold a default value for the template parameter, and prompt_string 435 for interactively obtaining the value of a template parameter from a user. In one embodiment, the data dictionary table TEMPLATE_PARMS 430 is automatically populatated when a DDL_text 415 is added to the data dictionary table TEMPLATE_OBJECTS 410. In the example, data dictionary table TEMPLATE_PARMS 430 would be automatically populated with an entry for the ":rep_id" template parameter.

Data dictionary table USER_PARMS 440 contains parameter values for a user identified by the user_id 443. Each entry in the data dictionary table USER_PARMS 440, keyed by the user_parameter_id 441, specifies a template_parameter_id 442 (correlated to template_parameter_id 431), the user_id 443, and the parm_value 444, for example, "Smith" or "Jones." Thus, if the entire sales forces is entered into the data dictionary table USER_PARMS 440, then refresh groups for each sales representative can be instantiated with little intervention by a database administrator other than starting off the process.

Data dictionary table TEMPLATE_SITES 450 tracks the installation and deletion of refresh group templates at the various sites in a distributed database system. This data dictionary table is provided to aid a database administrator in the ongoing maintenance of refresh group templates instantiated across a number of sites. In one embodiment, each entry contains a template_site_id 451 to identify each entry herein, a refresh_template_id 452 to identify the refresh group template that was instantiated, a user_id 453 to identify the user who instantiated the refresh group template, the site_name 454 to identify the site at which the right was instantiated, and a status 455.

After storing parameterized DDL texts for creating the various objects of a refresh group in data dictionary table TEMPLATE_OBJECTS 410 and the desired values for the template parameters in data dictionary table USER_PARMS 440, the master database server 202 can loop through the template objects for each user and create all the various snapshots for a suite of front office automation applications. Accordingly, ease of mass deployment of front office application for thousands of sales representatives in a sales force is greatly improved from the perspective of the database administrator.

Off-Line Instantiation

According to another aspect of the invention, a laptop does not even need to be connected to the master site 200 to instantiate a refresh group of one or more snapshots on the laptop, because the information to instantiate the refresh group at the laptop is provided on a transportable computer-readable medium similar to import/export. The computer-readable medium, such as a floppy disk, magnetic tape cartridge, a CD-ROM and the like, is applied to the laptop (as by inserting a CD-ROM into a CD-ROM drive). Executing an import operation causes the refresh group to be imported from the computer-readable medium to the main storage of the laptop.

Figure 5:
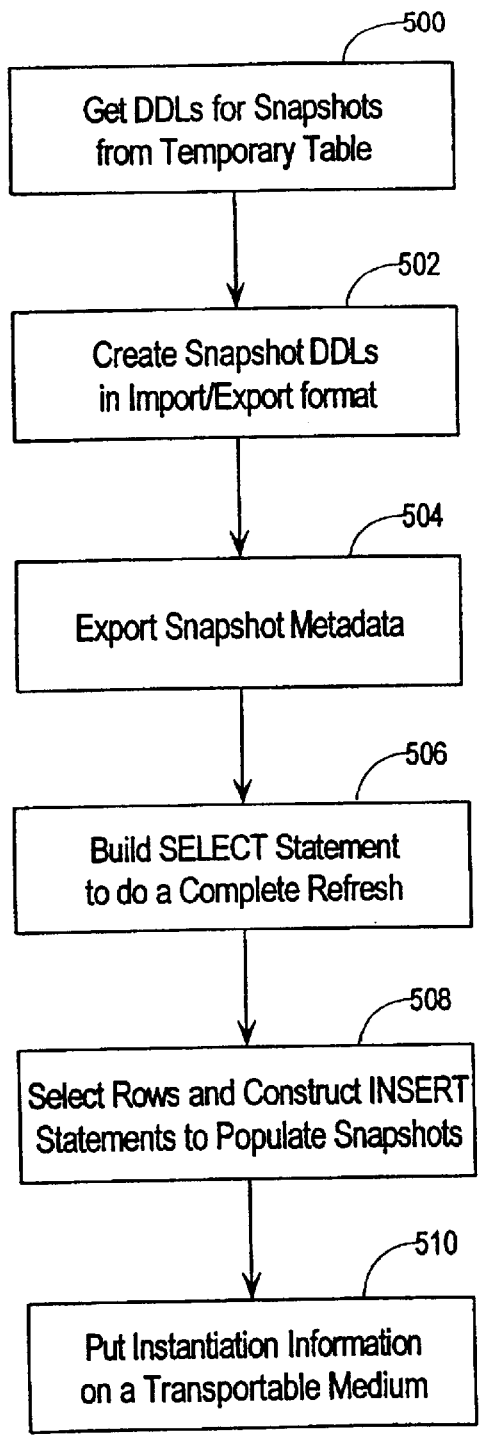
FIG. 5 is a flowchart for off-line instantiation of snapshots in a mass deployment for an embodiment.

Referring to FIG. 5, which illustrates how a computer-readable medium for off-line instantiation is created, the DDLs for the snapshot are obtained in step 500 from a temporary table (whose lifetime is that of a database session) that was filled by looping through the refresh group template metadata as described hereinabove. In step 502, the snapshot DDLs are created in import/export format, and, in step 504, the metadata for the snapshot is exported. Since each snapshot is fully populated for off-line instantiation of refresh groups, a SQL select statement is built to do a complete refresh (step 506). This select statement is used to select rows from the master table(s) to construct SQL insert statements that populate the snapshots with the appropriate data (step 508). Finally, this generated instantiation information is placed on a transportable, computer-readable medium, such as by "burning" a CD-ROM, or copying the information to a high-capacity magnetic disk (step 510).

Alternatively, when the client application 202 does not employ SQL or full relational database technology, the snapshot data is converted into a format used by the client application 202 before being placed on the transportable computer-readable medium. For example, if the client application 202 is a JAVA™ application, then the snapshot data is converted into corresponding JAVA™ objects and serialized. Importing the snapshot data at the client site 200 from such a transportable computer-readable medium merely requires deserialization of the serialized JAVA™ objects.

Therefore, a refresh group of snapshots for an entire suite of front office applications can be instantiated on a laptop without the intervention of an experienced database administrator (since importing database objects from a computer-readable medium is administratively straightforward) or maintaining a network connection between the laptop and the master site 200 during the entire instantiation process.

Refreshing Snapshots

At some point after a refresh group of snapshots 232, 234 has been instantiated at a laptop client site 220, the sales representative will want to refresh the snapshots 232, 234 to bring them up to date. In addition, if the snapshots 232, 234 have been installed as updatable snapshots, the sales representative may have changes such as new customer orders to be uploaded to the master site 200. Accordingly, the sales representative would connect the laptop 220 to the master site 200, for example by a dial up telephone line or the like, and request to update the snapshots 232, 234 on the laptop 220.

Figure 6:
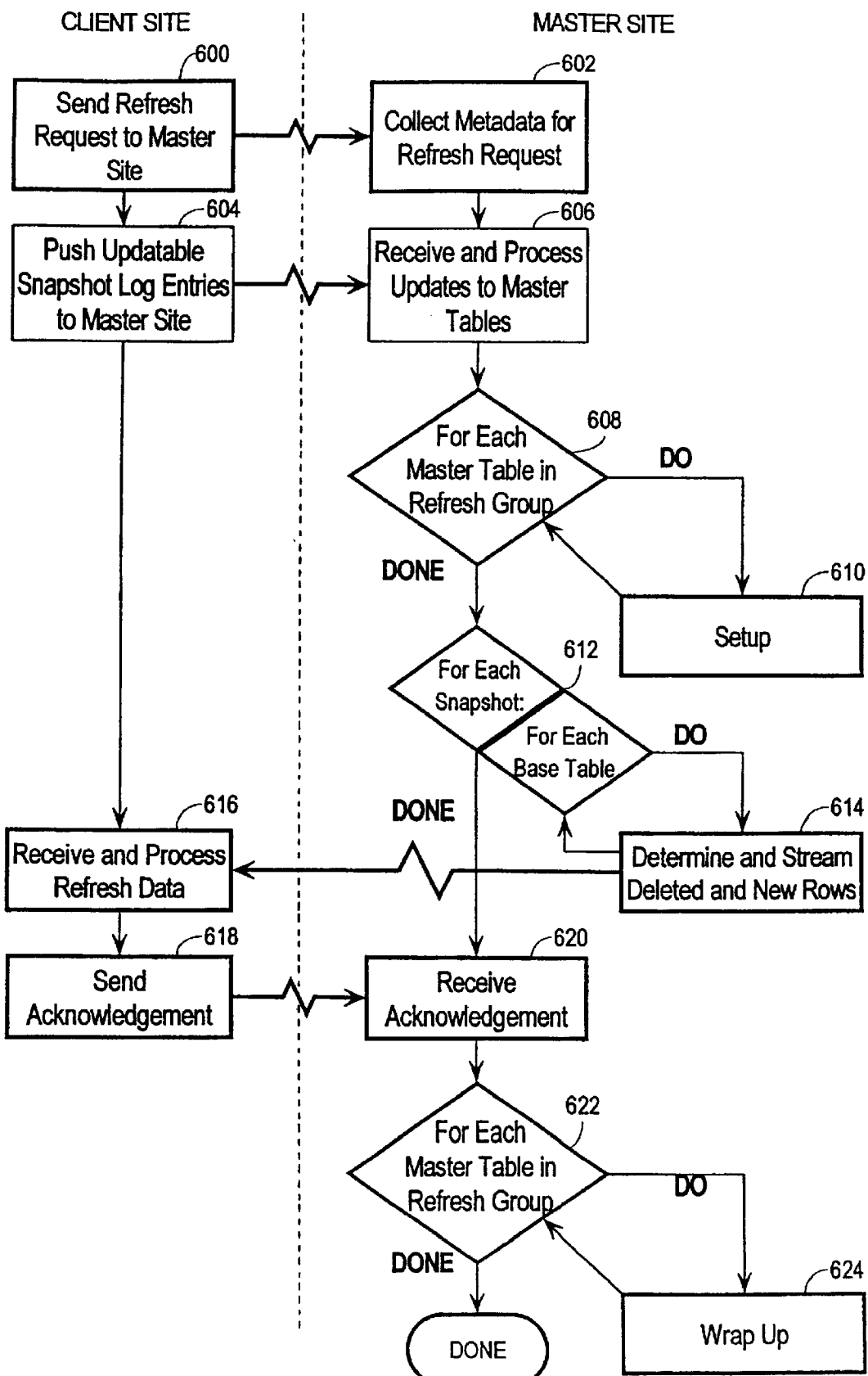
FIG. 6 is a flowchart for refreshing a group of snapshots for an embodiment.

FIG. 6 is a flowchart showing a fast refresh of snapshots 232, 234 on laptop client site 220 in accordance with an embodiment. At step 600, the sales representative connects by giving a login name and password and sends a refresh request to the master site 200, identifying the refresh group to be brought up-to-date and including a refresh sequence number that serves as an acknowledgement that the last refresh was successfully performed. At step 602, the master database server 202 collects the snapshot metadata 206 to process the refresh request.

If the local snapshots are updatable and updates have been indeed been made to the updatable snapshots, the queued updates are pushed to the master site 200 from the locally maintained update snapshot logs and the corresponding locally inserted entries in the snapshots are deleted (step 604). The master database server 202, in response, receives the updates, stores them in a temporary table (whose lifetime is that of a database session while the client site 220 is connected to the master site 200), and applies the updates to the master tables (step 606).

At this point, refreshing the snapshots 232, 234 in the specified refresh group is driven entirely at the master site 200, iterating over each snapshot 232, 234 and its master tables 212, 214, to reconcile their differences with the snapshots 232, 234 without incurring numerous round trip RPCs between the master site 200 and the client site 220. In a bulk set up loop controlled by step 608, the master database server 202 repeatedly performs the set up operation (step 610). The set up operation, which is used because there can be multiple snapshots 232, 252 defined for the same table 212, processes the master log files corresponding to the master tables 212, 214 to set the refresh time of the most recently added changes to the master tables 212, 214 in the master logs to the current refresh time.

A disadvantage with a doubly nested loop for performing the set up operation is evident with multiple snapshots refer to the same master table. In this situation, the same master table logs would be unnecessarily set up multiple times. The bulk set up loop, however, iterates once over every master table in the refresh group, thereby setting up the master table log only once, even when multiple snapshots refer to the corresponding master table. This feature is independently applicable an improvement to high-end snapshot replication implementations.

In the doubly nested loop controlled by step 612, the master database server 202 formulates SQL select statements based on the snapshot metadata 206 and executes the SQL select statements on the relational database 204, first to determine the deleted rows and then to determine the new rows that updated or inserted. These rows are streamed to the client application 222 at the client site (step 614), preferably by a lightweight row transfer protocol described hereinafter. In response, the client application 222 receives and processes the refresh data in step 616. If the changes are successfully applied, the client application 222 sends an acknowledgement in step 618. In response to receiving the acknowledgement, master database server 202 commits the changes to the master logs (step 620).

Finally, in the bulk wrap up loop controlled by step 622, the master database server 202 performs the wrap up operation (step 624). The wrap up operation, also used because there can be multiple snapshots defined for the same table, purges the master logs of the entries that are older than the least recently refreshed snapshot to prevent the master logs from growing unacceptably large.

It is therefore evident that driving the snapshot refresh at the master site in accordance with an aspect of the invention dramatically reduces the number of round trip RPCs. For example, to refresh a refresh group containing 200 snapshots each using two master tables, the high-end approach required at least 1600 RPCs, but the corresponding master-driven snapshot refresh uses only one round-trip RPC, to send the refresh request in step 600 and get back the data in step 616. Furthermore, with a half-second latency per RPC, the 1600 RPCs in the high-end approach required a minimum of 800 seconds of pure overhead, or more than 13 minutes of connect time, in addition to the time required to reconcile the differences and transmit the difference to the client site 202. This latency overhead is reduced from the 13 plus minutes to the half second latency for the single RPC.

Security

The interface at steps 600 and 602 for initiating snapshot refreshes to be driven at the master site 200 instead of driving the snapshot refresh entirely from the client site 220 also facilitates the implementation of another security feature pertaining to untrusted users. For untrusted users, granting select privileges even for a specific table may be too generous, because an unauthorized user could gain access the entire customers master table 212 at the master site 200 by using the untrusted user's login and password, even though the accessed laptop only contained a small subset of the customer master table in a customers snapshot.

In this scenario, untrusted users are granted permission only to connect to the master site 200 and to run the refresh program. Thus, an unauthorized user can do little other than to obtain a more recent version of the data the untrusted user was allowed to see by refreshing the local snapshots.

Figure 7:
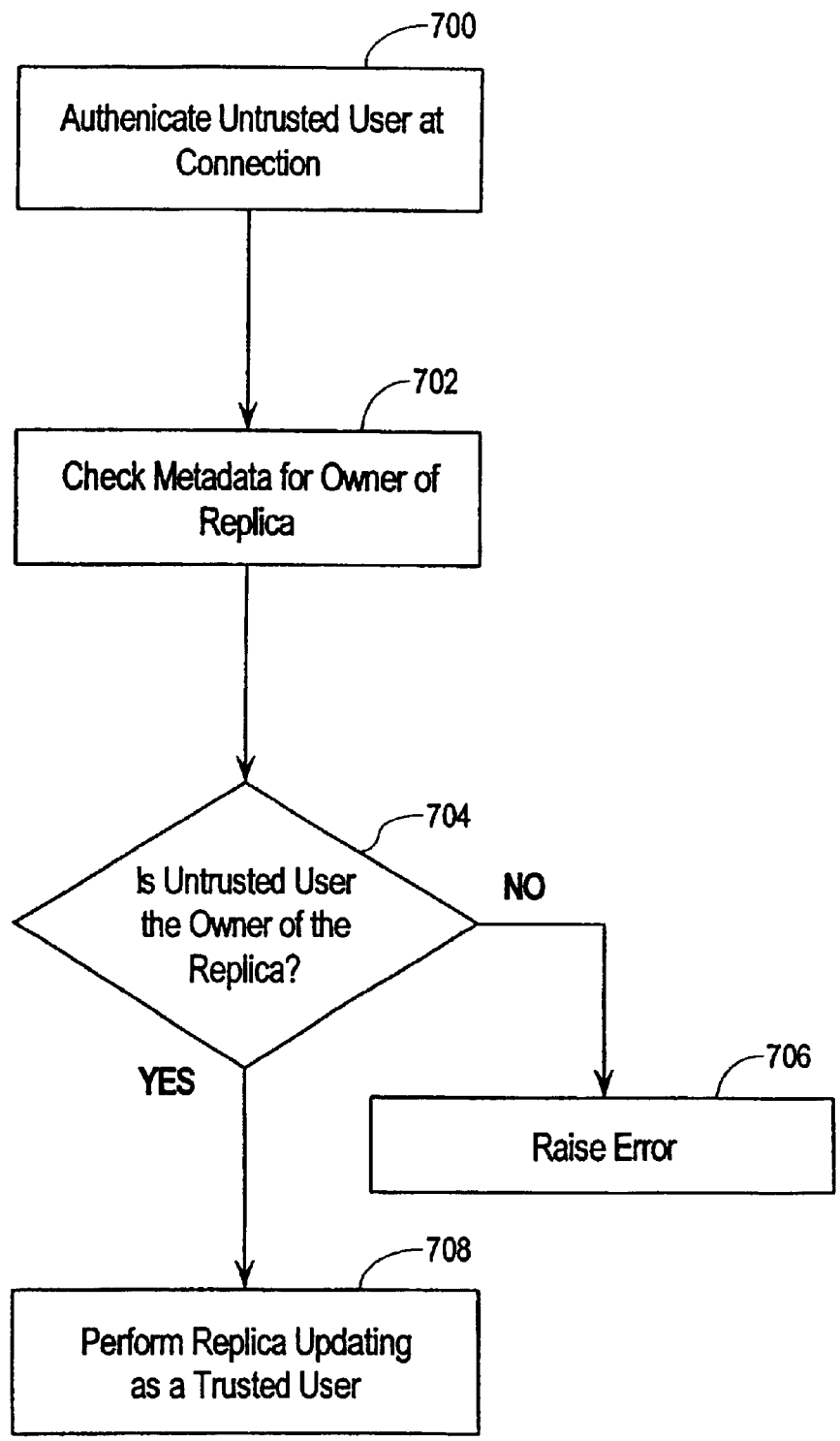
FIG. 7 is a flowchart for authorizing a snapshot owner to refresh a snapshot for an embodiment.

Referring to FIG. 7, the untrusted user is authenticated at connection time with the login and password (step 700) Connection by login and password, however, is an access path also available to an unauthorized user, because the untrusted user may have made the password available to the unauthorized user who found or stole the laptop. The snapshot metadata 206 is checked to determine if the authenticated user is the owner of the refresh group (step 702). If the untrusted user is not the owner of the snapshot (tested at step 704), then an error is raised (step 706) preventing access of the untrusted user to another user's data through the refresh mechanism.

At step 708, the actual refreshing of the snapshot, including reconciling the differences between the snapshot and the master tables, is performed in the security domain of a trusted user. Therefore, any untrusted user who obtains a connection to the master site 200, whether an authorized sales representative or a malicious hacker, can do little more than refreshing the local snapshots and perhaps make modifications to the master tables through the updatable snapshot mechanism. However, the latter scenario can be guarded against by row-level security measures.

Column-Level Subsetting for Upward Compatibility

The term upward compatibility refers to the ability of an earlier version of an application to coexist with a later version of the application. For example, one version of a front office automation application purchased from a vendor may be installed in a distributed database system with a sales force using laptops, with the above-described mass deployment and off-line instantiation techniques. When the vendor upgrades the front office automation application by adding features and when the sales force purchases the upgrade, it becomes necessary to coordinate the changes introduced by the new version of the front office automation application, especially when one of the columns in the master table has been added or deleted.

Since laptops can remain disconnected from the master site 200 for a considerable period of time, it is possible for a sales representative to make changes to the laptop's updatable snapshots in a version of the front office automation application that is older than the one installed at the master site 200. For example, one of the columns in the master table could have been added. The queued changes, therefore, would not refer to a column that exists in the master table.

Figure 8A:
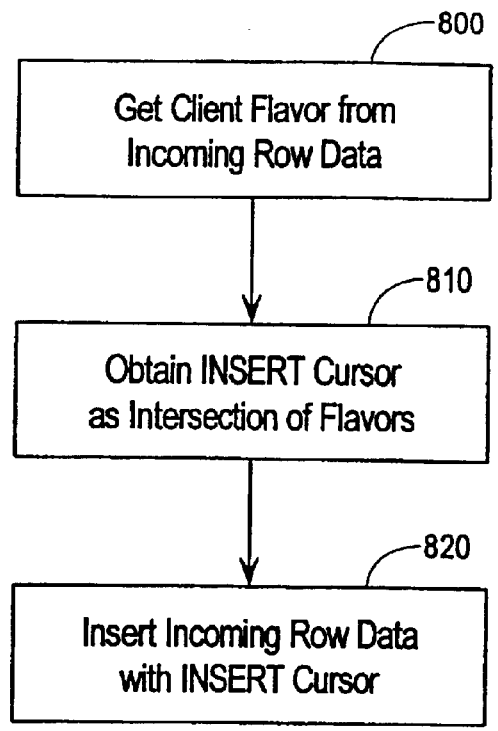
FIGS. 8(a) and 8(b) are flowcharts for supporting upward migration of snapshots for an embodiment.
Figure 8B:
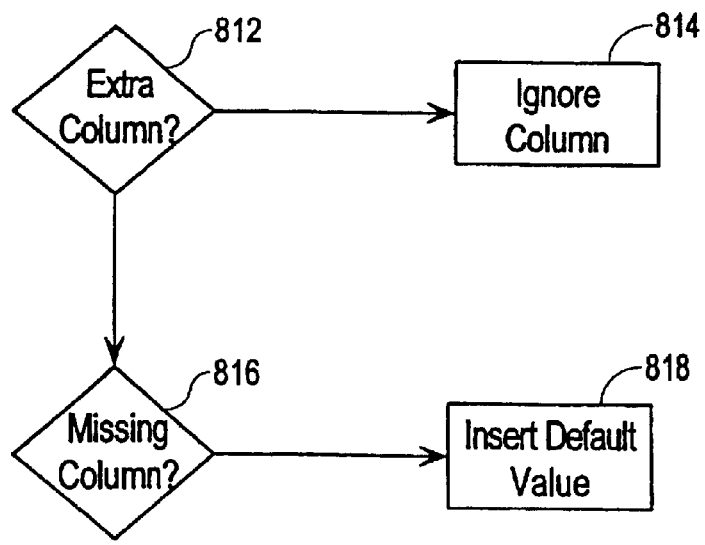

In accordance with one aspect of the invention, illustrated in FIG. 8(*a*), the flavor of the object group of the master tables based upon which the laptop's snapshots have been instantiated is sent along with the rows that are pushed to the master site 200 and received by the master database server 202 (step 800). The flavor of an object group describes which subset of columns exist within a flavored object group. Thus, the master database server 202 is able to identify which columns are held in common by performing an intersection of the flavor of the master site 200 and the client site 220 and then to generate an INSERT cursor that implements that intersection when invoked to insert rows at the master tables (step 820).

FIG. 8(*b*) illustrates the logic supported by the generated INSERT cursor. If the column in the pushed updates from the client site 220 is an extra column that is no longer found in the flavor of the master site 220 (step 812), then the extra column is simply ignored (step 814). On the other hand, if the pushed updates from the client site 220 fails to include a column that is missing from the flavor of the client site 220 but present at the master site 200 (step 816), then the missing column is filled with a default value (step 818).

Therefore, the use of flavors allows for updates to updatable snapshots to be propagated from the client site 220 to the master site 200, without having to coordinate first a connection of all the client sites 220, 240, etc. to the master site 200 for upgrading of the client sites 220, 240, etc.

Lightweight Communication

In accordance with yet another aspect, a lightweight communication protocol is employed in transferring the bulk of the data between the master site 200 and the client site 220 in refreshing the snapshots. Referring back to FIG. 6, such a lightweight protocol may be employed in transferring the updatable snapshot log entries from the client site 220 at step 604 to the master site 200 at step 606 (the "push" direction) and the deleted and new rows from the master site 200 at step 614 to the client site 220 at step 616 (the "refresh" direction).

Figure 9:
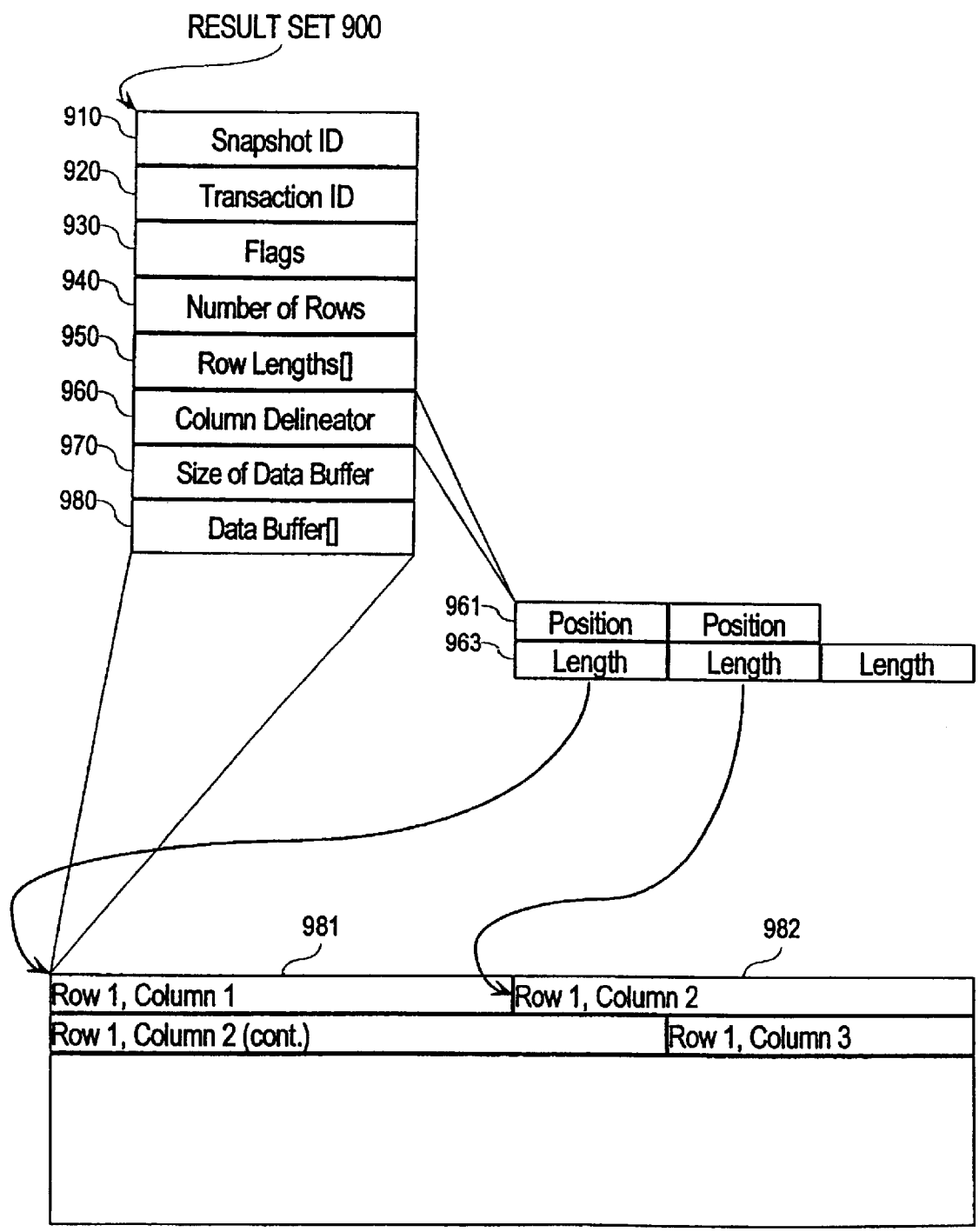
FIG. 9 is a schematic depiction of a result set in accordance with a row transfer protocol of an embodiment.

More specifically, such a lightweight communication employs a thin protocol that specifies that one or more rows of data in propagating changes between a snapshot and a master table are grouped together into a "result set." FIG. 9 depicts one implementation of a result set 900, in which the bytes that constitute the data for the rows are bundled into a data buffer 980, whose size is given by data buffer size 970. The delineation of those bytes into rows and columns are governed by flags 930, the number of rows field 940, the row lengths array 950, and the column delineator structure 960. The column delineator structure 960 includes a position indicator 961 and a column length array 963.

The meaning and presence of some of these header fields are context dependent, as described hereinafter, depending on whether the result set is used in the "refresh direction" (from master site 200 to client site 220) or in the "push direction" (from client site 220 to master site 200). However, one of the flags 930, indicating whether or not the sizes for the column lengths are normalized, is used in both directions.

A "normalized column length size" refers to a number of bytes in which the lengths of all the column data in the result set 900. For example, if the longest length of the column data is 120 bytes, then the normalized column length size would be 1, because all the column lengths can fit in one signed byte. As another example, if the longest column data length is 70,000 then at least three bytes is required to hold all of the column lengths.

Figure 10A:
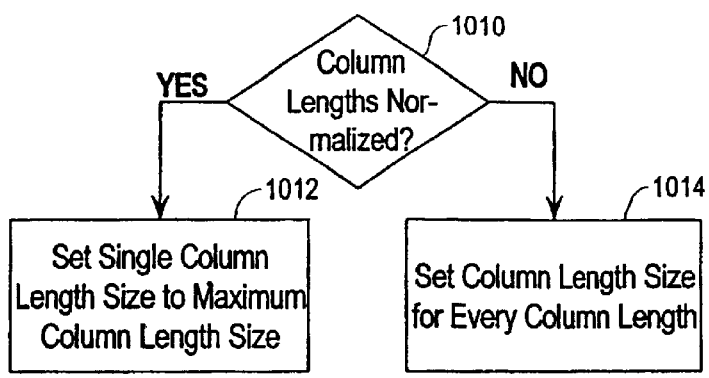
FIGS. 10(a), 10(b), and 10(c) are flowcharts for packaging the result set.
Figure 10B:
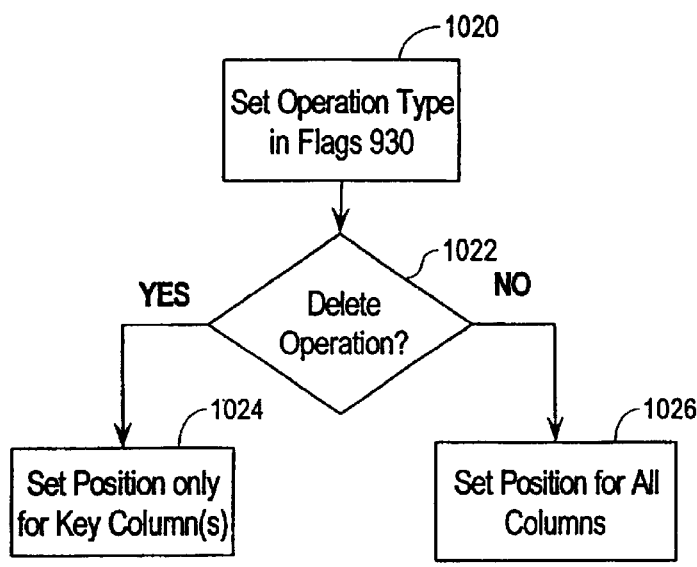
Figure 10C:
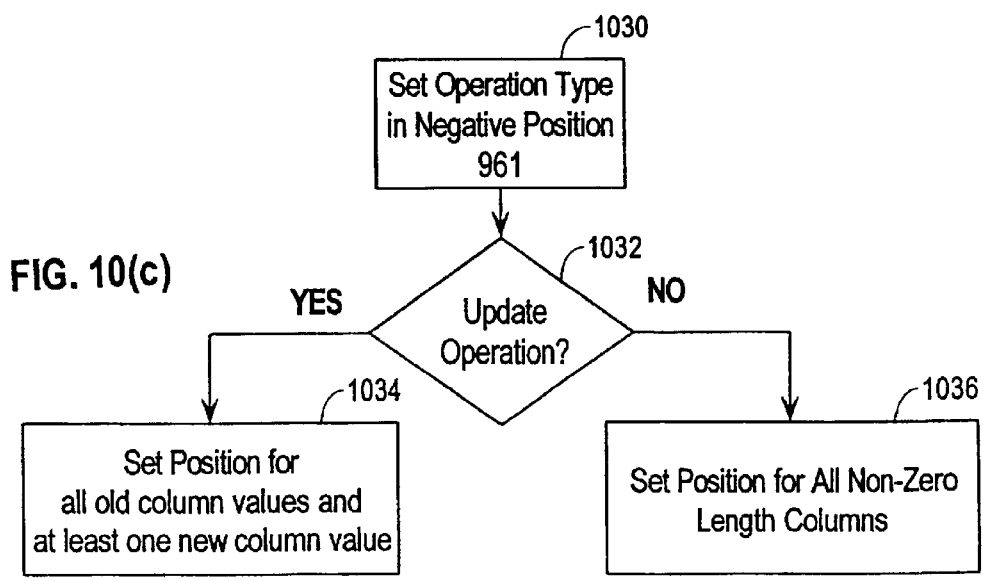

Accordingly, as shown in FIG. 10(*a*), the sending site (either master site 200 in the refresh direction or client site 220 in the push direction) determines whether the column lengths should be normalized, for example, by checking the maximum column lengths of all the fields (step 1010). If, for example, the maximum column length can fit in two bytes because there is no LOB data, then the normalized column bit in the flags 930 is set and a single column length size, for example a 2 in the first entry of the column length array 963, is set to the maximum column length (step 1012). If, on the other hand, column lengths should not be normalized, then the column length size is set as a prefix before every column length in the column length array 963.

Figure 11A:
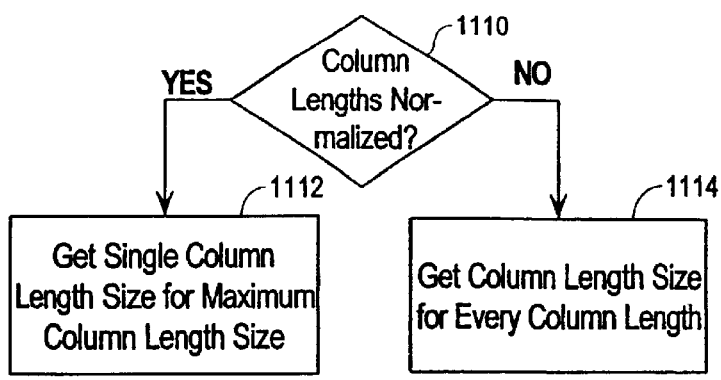
FIGS. 11(a), 11(b), and 11(c) are flowcharts for unpacking the result set.
Figure 11B:
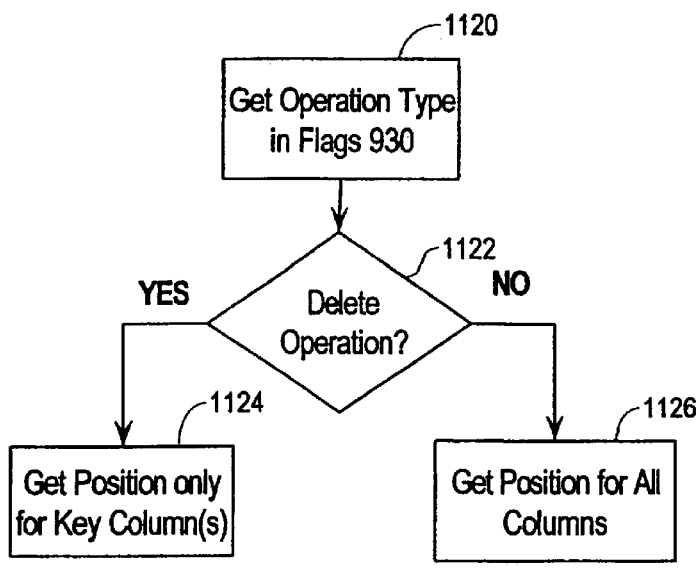
Figure 11C:
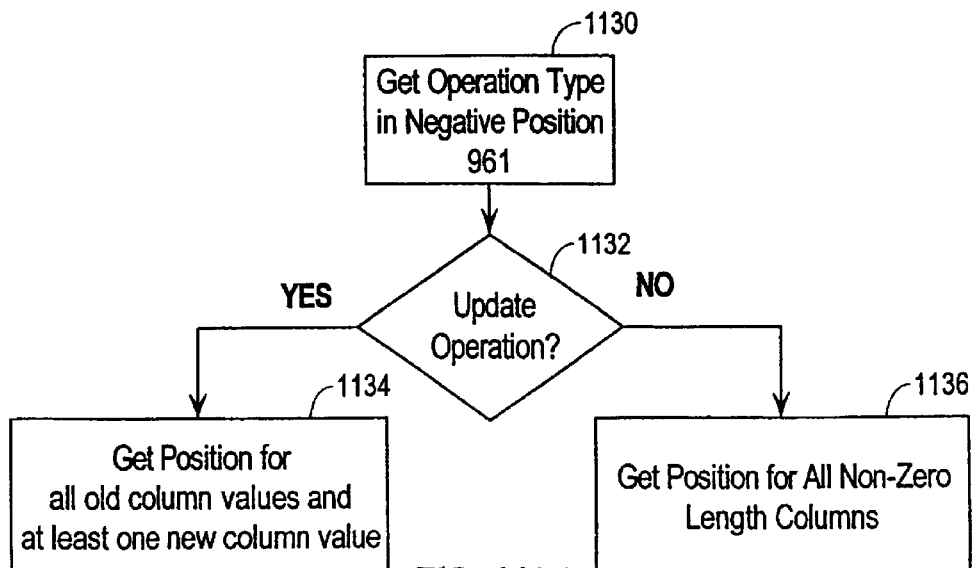
Figure 12:
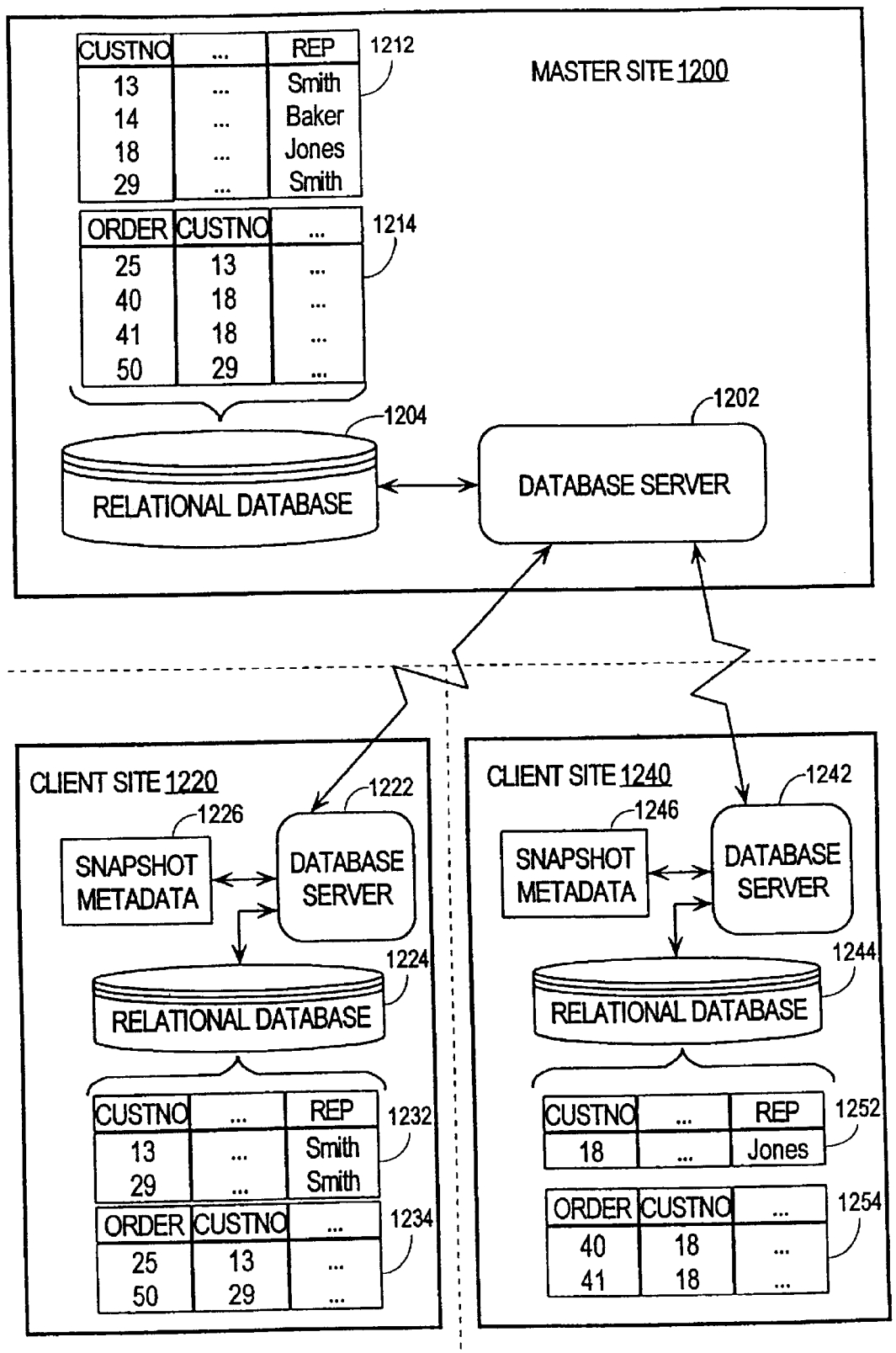
FIG. 12 is a schematic depiction of a high-end snapshot replication environment.
Figure 13:
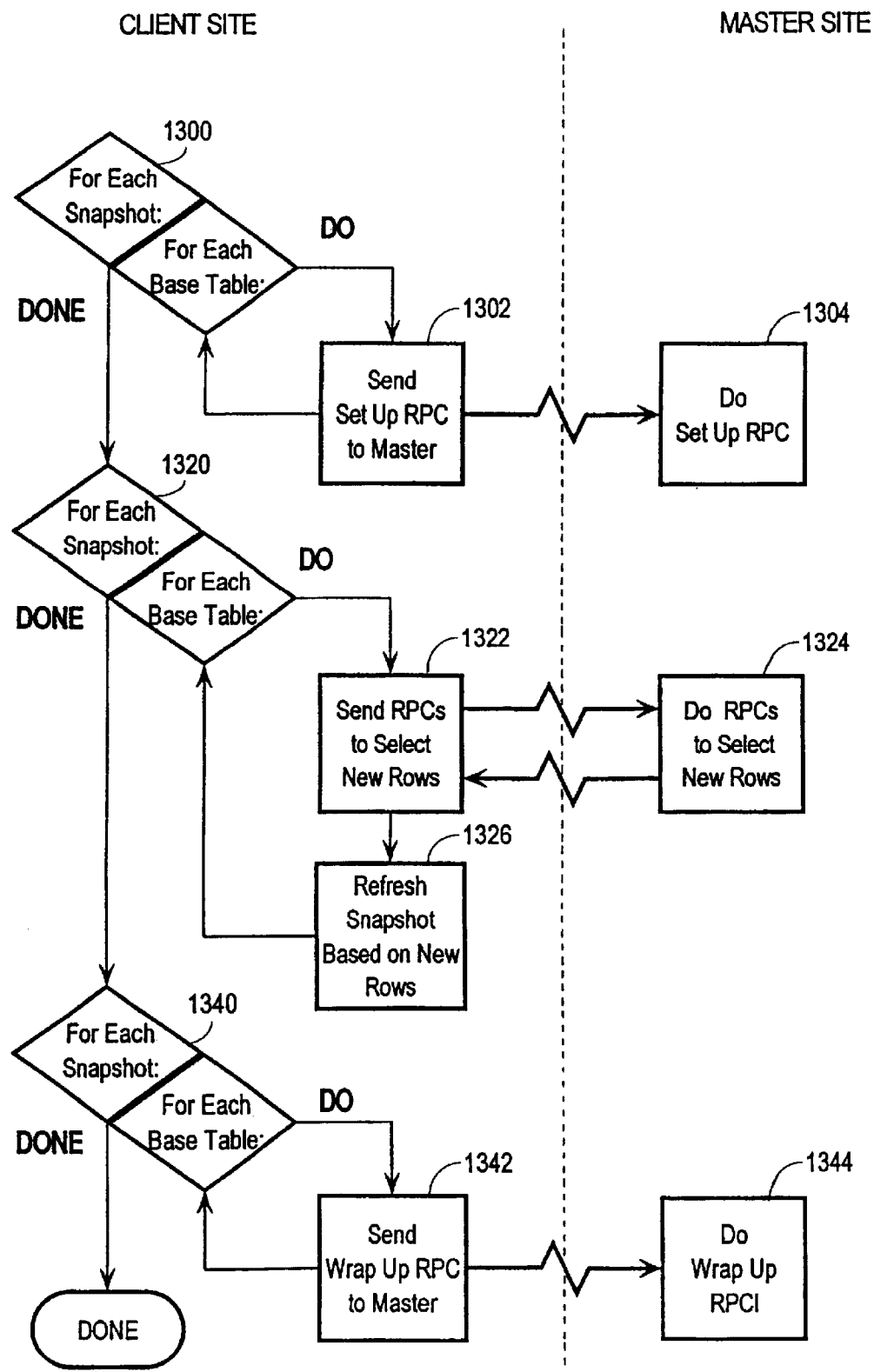
FIG. 13 is a flowchart for refreshing a snapshot in a high-end distributed database system.

At the receiving site, shown in FIG. 11(*a*), the process is reversed where the flags 930 is checked to determine whether the sizes of the column lengths are normalized (step 1110). If the sizes of the column lengths are normalized, then a single column length size, for example the first entry in the of the column length array 963, is used (step 1112). For example, if the first entry is a 2, then every two byte sequence remaining in the of the column length array 963 is fetched as a column length. If, on the other hand, the column length sizes are not normalized, then the column length size is fetched as a prefix before every column length in the column length array 963.

In both the refresh direction and the push direction, the flags 930 header field also indicates whether the result set 900 has been broken up into a plurality of separate message, and, if so, which message is the last one for the current result set 900. These flags allow the result set 930 to be transmitted at a buffer size, e.g. 4K, that is efficient for the particular connection between the master site 200 and the client site 220.

The number of rows 940 in the result set 900 header specifies the number of rows that presently encapsulated in the particular result set 900. The following field is an array of row lengths 950, which contains the length of each row in result set 900.

The data buffer size field 970 indicates the size of all the row data in the data buffer 980 to be transferred. The row data is stored in the data buffer 980 end-to-end, and the start of each row is governed by the row lengths array 950 and the start of each column is governed by the column delineators array 960.

Lightweight Communication in the Refresh Direction

Lightweight communication in the refresh direction refers to the streaming of row data from the master site 200 to the client site 220. The flags 930 for this direction further indicates whether the rows contained in the result set 900 are rows to be deleted in the snapshot, rows to be inserted into snapshot, or rows to be "upserted" in the snapshot (updated if present, else inserted). Other values of the flags header field 930 in the refresh direction indicate whether the result set 900 is being transmitted for a inner table (e.g customers master table 212 for the orders snapshot 234) or the outer table (e.g the orders master table 214 for the orders snapshot 234). The inner and outer table flags are set if a snapshot defined by a subquery is being processed, because the refresh data for the inner table include additional information to correlate the inner table rows to the outer table rows. Subquery snapshots are described in the commonly assigned U.S. patent application Ser. No. 08/880,928, entitled "Fast Refresh of Snapshots Containing Subqueries" filed on Jun. 23, 1997 by Alan Downing et al., the entire contents of which of are hereby incorporated by reference herein.

The position array 961 is used differently depending on the value of the operation type. If the operation type is insert or upsert, potentially the entire row will be needed and therefore every column is sent. Accordingly, the position array 961 is set for all the columns in the snapshot. On the other hand, for a delete operation all such columns are unnecessary; thus, only the key columns are sent, with the position array 961 set to indicate that fact. For example, if only columns 2 and 3 are sent, then the position array 961 would have a 2 and a 3.

Consequently, the sending site operates as shown in FIG. 10(*b*), where the operation type (delete, insert, upsert) is set in the flags 930 (step 1020). If the operation is a delete (step 1022), then the position array 961 is set only for the key columns (step 1024), but for the insert and upsert operations, the positions for all the columns are set (step 1026). In the other direction, shown in FIG. 11(*b*), the receiving site checks the operation type in flags 930 (step 1120). If the operation is a delete (step 1122), then the position array 961 is fetched only for the key columns (step 1124), but for the insert and upsert operations, the positions for all the columns are fetched from the position array 961 (step 1026).

Lightweight Communication in the Push Direction

In the push direction, the flags header field 930 indicates whether the result set is for a normal deferred transaction, whether the result set is for an error transaction (which occurs if a deferred transaction encountered an error and the master database server 902 requests the same row data to be pushed up again) or whether the result is "re-pushed". A re-push occurs when a client had previously only pushed the local updates, but decided not to refresh the local snapshot. In the case of a re-push, only the primary keys (old and new) are sent.

Since conflict resolution at the master site 900 uses both the old and new values for the column values in the push direction, it is desirable to reduce the amount of data being sent for conflict resolution. Thus, one of embodiment of the invention employs the techniques described in U.S. patent application Ser. No. 09/081,297 entitled "Method for Data Replication with Conflict Detection" filed on May 20, 1998 by James Stamos et al., the whole contents of which are incorporated by reference herein, in which the columns are partitioned into column groups, new and old values for unmodified column groups are not sent, and either of the new and old values for unmodified columns in a modified column group are not sent.

In contrast with the refresh direction, the result set 900 is not batched based on operation type. Rather the different rows of the result set are sent in the sequence in which the corresponding changes were made. Further the updatable snapshot queue contains updates for every snapshot at a particular master, regardless of the refresh group. Consequently, each row in the updatable snapshot queue includes a snapshot identifier for the updated snapshot, a DML type (insert, update, and delete) to indicate the operation, and a column changed vector to indicate which columns have changed. This information is included in the row data as columns with negative positions. For example, position −3 may be the snapshot identifier, position −2 the DML type, and position −1 the change vector.

Since the rows may be from different snapshots, the position array 961 explicitly contains entries for every row. For insert and delete DML operations, the position array $61 skips over zero-length rows, general key columns, changed columns, columns required for conflict resolution, and columns needed by a trigger at the master site. For the update DML operation, however, the position array $61 includes a position for all the old column even if zero-length, and for at least one new column.

Consequently, the sending site operates as shown in FIG. 10(*c*), where the DML type (delete, insert, udpate) is set in the position array 961 with a negative position value, such as −2 (step 1030). If the operation is an update (step 1032), then the position array 961 is set for the positions of all the old column values, followed by the position of at least one new column, thereby introducing a repeated position number (step 1034). For the other operations, however, the positions for all the columns are set, except for those column that are zero-length (step 1036). In the other direction, shown in FIG. 11(*c*), the receiving site checks the operation type in the position array 961 entry with a negative position (step 1130). If the operation is an update (step 1122), then the position array 961 is fetched the all old column values and at least one new column value, identified by a repeated position (step 1134). For the insert and delete operations, however, the positions for the columns are fetched from the position array 961, wherein skipped columns are considered to be zero-length (step 1136).

The above-described approach does not require the client site to implement SQL or PL/SQL, an extension to SQL available from Oracle Corp., of Redwood Shores, Calif. As a result, the client site laptop can be installed with thin clients, such as JAVA™ applications using CORBA, because the lightweight communication protocol requires much less computing resources than a thick SQL or PL/SQL protocol.

Various techniques, therefore, have been described for implementing snapshot replication in an environment that is common in front office automation, wherein much of the processing for refreshing snapshots instantiated at a large number of small client sites 220, 240, such as laptops, is performed at a relatively powerful master site 200. Provision of the heart of the snapshot refresh mechanism and the snapshot metadata 206 at the master site 200 not only significantly reduces round-trip communication costs but also enables a cascading series of additional improvements, such as the ability to use thin client applications 222, 224 with a lightweight row transfer protocol, increased security for an increased number of untrusted users, mass deployment and off-line instantiation of front office automation, and support for evolving applications.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of propagating changes to a body of data from a master site to a client site, comprising the steps of:

establishing a connection between the client site and the master site;

at connection time, authenticating a user at the client site as an untrusted user at the master site;

generating a refresh request at the client site, said client site storing a replica of a body of data;

transmitting the refresh request to the master site;

in response to the refresh request, reconciling differences at the master site between the replica and the body of data in a security domain of a trusted user;

transmitting the differences to the client site; and receiving the differences at the client site and updating the replica of the body of data based on the received differences.

2. The method of claim 1, wherein the replica includes a snapshot and the body of data includes one or more master tables.

3. The method of claim 1, further comprising the step of storing at the master site metadata describing the replica of the body of data stored at the client site.

4. A method of propagating changes to a body of data from a master site to a client site, comprising the steps of:

defining a refresh group to contain a replica of the body of data and at least one other replica of another body of data stored at the master site;

generating a refresh request at the client site, said client site storing the replica of the body of data and said refresh request indicating the refresh group;

transmitting the refresh request to the master site;

in response to the refresh request, reconciling differences at the master site between the replica and the body of data and between the other replica and the other body of data;

transmitting the differences to the client site; and receiving the differences at the client site and updating the replica and the other replica based on the received differences.

5. The method of claim 4, wherein the replica includes a snapshot and the body of data includes one or more master tables.

6. The method of claim 4, further comprising the step of storing at the master site metadata describing the refresh group instantiated at the client site.

7. The method of claim 4, wherein the step of reconciling differences at the master site between the replica and the body of data includes the step of reconciling the differences in a security domain of a trusted user.

8. A method of propagating changes to a plurality of master tables from a master site to a client site, comprising the steps of:

defining a refresh group to contain a plurality of snapshots constructed of data from the master tables, said client site storing the replica of the body of data;

generating a set up request at the client site, said set up request indicating the refresh group;

transmitting the set up request to the master site;

in response to the set up request, processing master log files corresponding to the master tables to set a refresh time of recently added changes to the master tables in the master logs to a current refresh time;

reconciling differences between the snapshots and the master tables;

updating the snapshots based on the reconciled differences.

9. The method of claim 8, further comprising the steps of:

generating a wrap up request at the client site, said wrap up request indicating the refresh group;

transmitting the wrap up request to the master site;

in response to the wrap up request, purging the master logs of the entries that are older than a least recently refreshed snapshot.

10. A method of propagating changes to one or more master tables from a master site to a client site, comprising the steps of:

defining a refresh group to contain a plurality of snapshots constructed of data from any of the one or more master tables;

generating a refresh request at the client site, said client site storing the snapshots and said refresh request indicating the refresh group;

transmitting the refresh request to the master site;

receiving the differences at the client site and updating snapshots based on the received differences.

11. The method of claim 10, further comprising the step of extracting the differences at the client site from a result set having a plurality of column delineators indicating lengths of fields for said transmitting the differences to the client site.

12. A method of propagating changes to a snapshot from a master site to a client site, comprising the steps of:

defining a refresh group to contain a plurality of snapshots constructed of data from any of the one or more master tables, said client site storing the snapshots and said master site storing the one or more master tables;

receiving a refresh request at the master site, said refresh request indicating the refresh group;

in response to the refresh request, reconciling differences at the master site between the snapshots and the one or more master tables; and transmitting the differences to the client site.

13. The method of claim 12, further comprising the step of storing at the master site metadata describing the refresh group being instantiated at the client site.

14. The method of claim 12, further comprising the step of packaging the differences at the master site into a result set having a plurality of column delineators indicating lengths of fields for said transmitting the differences to the client site.

15. A computer-readable medium bearing instructions for propagating changes to one or more master tables from a master site to a client site, said instructions arranged, when executed by one or more processors, to cause the one or more processors to perform the steps of:

defining a refresh group to contain a plurality of snapshots constructed of data from any of the one or more master tables;

generating a refresh request at the client site, said client site storing the snapshots and said refresh request indicating the refresh group;

transmitting the refresh request to the master site;

receiving the differences at the client site and updating snapshots based on the received differences.

16. The computer-readable medium of claim 15, wherein said instructions are further arranged to cause the one or more processors to perform the step of extracting the differences at the client site from a result set having a plurality of column delineators indicating lengths of fields for said transmitting the differences to the client site.

17. A computer-readable medium bearing instructions for propagating changes to a snapshot from a master site to a client site, said instructions arranged, when executed by one or more processors, to cause the one or more processors to perform the steps of:

defining a refresh group to contain a plurality of snapshots constructed of data from any of the one or more master tables, said client site storing the snapshots and said master site storing the one or more master tables;

receiving a refresh request at the master site, said refresh request indicating the refresh group;

in response to the refresh request, reconciling differences at the master site between the snapshots and the one or more master tables; and transmitting the differences to the client site.

18. The computer-readable medium of claim 17, wherein said instructions are further arranged to cause the one or more processors to perform the step of storing at the master site metadata describing the refresh group being instantiated at the client site.

19. The computer-readable medium of claim 17, wherein said instructions are further arranged to cause the one or more processors to perform the step of packaging the differences at the master site into a result set having a plurality of column delineators indicating lengths of fields for said transmitting the differences to the client site.

* * * * *